(12) United States Patent
Zhu et al.

(10) Patent No.: US 12,055,085 B2
(45) Date of Patent: Aug. 6, 2024

(54) HIGH-PRESSURE SCR SYSTEM WITH VENTING AND PRESSURE-STABILIZING FOR MARINE DIESEL ENGINE AND SHIP HAVING THE SAME

(71) Applicant: SHANGHAI MARINE DIESEL ENGINE RESEARCH INSTITUTE, Shanghai (CN)

(72) Inventors: Xiangli Zhu, Shanghai (CN); Xiaobo Li, Shanghai (CN); Teng Shen, Shanghai (CN); Qiuyan Chen, Shanghai (CN); Mingsai Du, Shanghai (CN)

(73) Assignee: SHANGHAI MARINE DIESEL ENGINE RESEARCH INSTITUTE, Shanghai (CN)

( * ) Notice: Subject to any disclaimer, the term of this patent is extended or adjusted under 35 U.S.C. 154(b) by 176 days.

(21) Appl. No.: 17/767,867

(22) PCT Filed: Oct. 10, 2020

(86) PCT No.: PCT/CN2020/120240
§ 371 (c)(1),
(2) Date: Apr. 8, 2022

(87) PCT Pub. No.: WO2021/068945
PCT Pub. Date: Apr. 15, 2021

(65) Prior Publication Data
US 2023/0250745 A1 Aug. 10, 2023

(30) Foreign Application Priority Data
Oct. 11, 2019 (CN) .......................... 201910964538.7

(51) Int. Cl.
F01N 3/20 (2006.01)
F01N 3/30 (2006.01)
F01N 9/00 (2006.01)

(52) U.S. Cl.
CPC ........... F01N 3/208 (2013.01); F01N 3/2053 (2013.01); F01N 3/30 (2013.01); F01N 9/00 (2013.01);
(Continued)

(58) Field of Classification Search
CPC .......... F01N 3/208; F01N 3/2053; F01N 3/30; F01N 9/00; F01N 2240/26;
(Continued)

(56) References Cited

FOREIGN PATENT DOCUMENTS

| CN | 101798946 A | 8/2010 |
| CN | 101798946 B | 12/2012 |

(Continued)

OTHER PUBLICATIONS

International Patent Application No. PCT/CN2020/120240; Int'l Search Report; dated Jan. 14, 2021; 2 pages.

Primary Examiner — Phutthiwat Wongwian
Assistant Examiner — Diem T Tran
(74) Attorney, Agent, or Firm — BakerHostetler

(57) ABSTRACT

A high-pressure SCR system with venting and pressure-stabilizing for marine diesel engine, comprising an SCR reactor, a gas intake pipeline, an exhaust pipeline, a bypass pipeline, a pneumatic pipeline, first and second auxiliary pipelines When denitrification treatment is needed, the exhaust gas can enter from a flue gas inlet, sequentially pass through the gas intake pipeline, the SCR reactor, and the exhaust pipeline, and be discharged from a flue gas outlet. When denitrification treatment is not needed, the exhaust gas can enter the bypass pipeline from the flue gas inlet and be discharged from the flue gas outlet, the exhaust gas in the
(Continued)

SCR reactor and exhaust pipeline being pushed by compressed air entering from the first and second auxiliary pipelines to be discharged from the flue gas outlet. Also provided is a ship.

14 Claims, 1 Drawing Sheet

(52) U.S. Cl.
CPC ...... *F01N 2240/26* (2013.01); *F01N 2240/36* (2013.01); *F01N 2410/14* (2013.01); *F01N 2560/08* (2013.01); *F01N 2560/14* (2013.01); *F01N 2570/14* (2013.01); *F01N 2610/02* (2013.01)

(58) Field of Classification Search
CPC ............. F01N 2240/36; F01N 2410/14; F01N 2560/08; F01N 2560/14; F01N 2570/14; F01N 2610/02

See application file for complete search history.

(56) References Cited

FOREIGN PATENT DOCUMENTS

| | | | |
|---|---|---|---|
| CN | 106894867 | A | 6/2017 |
| CN | 107143418 | A | 9/2017 |
| CN | 109989806 | A | 7/2019 |
| CN | 107143418 | B | 4/2020 |
| CN | 211648281 | U | 10/2020 |
| CN | 109989806 | B | 2/2021 |
| CN | 112648048 | A | 4/2021 |
| DE | 112020001063 | T5 | 2/2022 |
| KR | 10-1535938 | B1 | 7/2015 |
| KR | 20170009233 | * | 1/2017 |
| KR | 20170099131 | * | 8/2017 |
| KR | 2019-0002867 | A | 1/2019 |
| KR | 20190067367 | * | 6/2019 |
| KR | 2021-0125066 | A | 10/2021 |
| WO | WO 2020/177707 | A1 | 9/2020 |
| WO | WO 2021/068945 | A1 | 4/2021 |

* cited by examiner

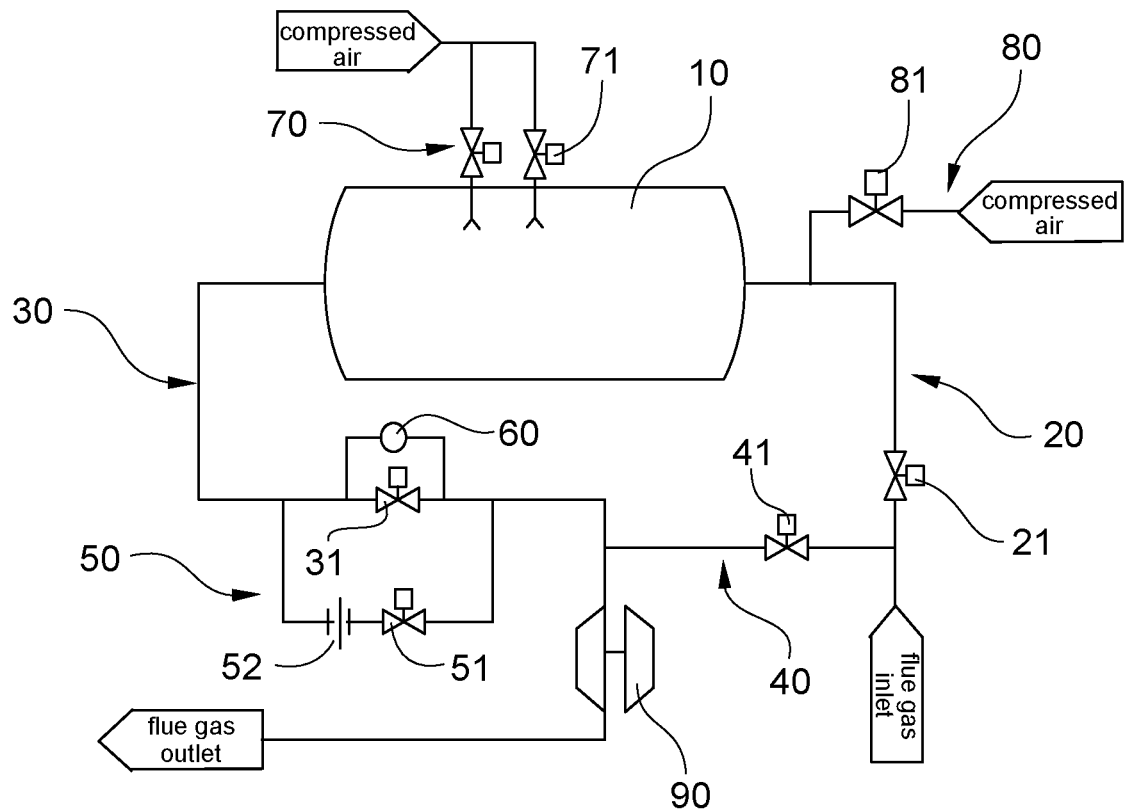

HIGH-PRESSURE SCR SYSTEM WITH VENTING AND PRESSURE-STABILIZING FOR MARINE DIESEL ENGINE AND SHIP HAVING THE SAME

CROSS-REFERENCE TO RELATED APPLICATIONS

This application is the National Stage of International Patent Application No. PCT/CN2020/120240, filed on Oct. 10, 2020, which claims priority to Chinese Patent Application No. 201910964538.7, filed on Oct. 11, 2019, the disclosures of which are incorporated herein by reference in their entireties.

BACKGROUND

The present invention generally relates to the technical field of aftertreatment of exhaust gas in marine diesel engine, and more specifically to a high-pressure SCR (Selective Catalytic Reduction) system with venting and pressure-stabilizing for marine diesel engine and a ship having the same.

Selective Catalytic Reduction (SCR) technology is a treatment process for $NO_X$ in tailpipe emissions from diesel engines, that is, ammonia or urea, as the reductant, is introduced to reduce the $NO_X$ in the exhaust gas into $N_2$ and $H_2O$ with the aid of a catalyst. SCR is used in the mainstream technology for aftertreatment of $NO_X$ in exhaust gas of marine diesel engine. The urea supply and injection system used SCR is the key part of the SCR system and serves the implement that accomplishes the supply, accurate dosing, and spray atomization of urea solution.

In the prior art, in the marine diesel engine equipped with the SCR system, when the marine diesel engine is switched from TierIII to TierII, it is necessary to use compressed air at a certain pressure to scavenge the SCR reactor and related pipelines for venting and sealing them, so as to ensure the SCR reactor and the pipelines kept clean and avoid corrosion of the pipelines due to sulfide generated in the SCR reactor and the pipelines. At this stage, typically throttle orifice plates are installed within the compressed air inlet and outlet pipelines and the scavenging remains continuing. However, this method usually leads to insufficient air exchange and poor reliability.

Therefore, there is a need to provide a high-pressure SCR system with venting and pressure-stabilizing for marine diesel engine and a ship having the same to at least partially solve the above-mentioned problems.

SUMMARY

A series of concepts in simplified forms are introduced into the portion of Summary, which would be further illustrated in the portion of the detailed description. The Summary of the present invention does not mean attempting to define the key features and essential technical features of the claimed technical solutions, let alone determining the protection scope thereof.

In order to at least partially solve the above problems, the present invention provides a high-pressure SCR system with venting and pressure-stabilizing for marine diesel engine, comprising:

an SCR reactor configured to denitrify exhaust gas of the diesel engine;

a gas intake pipeline, having one end provided with a flue gas inlet and the other end connected to a gas inlet of the SCR reactor, and the gas intake pipeline being provided with an SCR inlet valve;

an exhaust pipeline, having one end provided with a flue gas outlet and the other end connected to a gas outlet of the SCR reactor, and the exhaust pipeline being provided with an SCR outlet valve;

a bypass pipeline, having one end connected to the gas intake pipeline and the other end connected to the exhaust pipeline, and the bypass pipeline being provided with an SCR bypass valve;

a pneumatic pipeline, having both ends respectively connected to the exhaust pipeline on both sides of the SCR outlet valve, and the pneumatic pipeline being provided with a pneumatic valve;

a first auxiliary pipeline connected to and in communication with the SCR reactor, and the first auxiliary pipeline being provided with a first control valve;

a second auxiliary pipeline connected to and in communication with the gas intake pipeline, and the second auxiliary pipeline being provided with a second control valve;

wherein, in a venting state of the high-pressure SCR system with venting and pressure-stabilizing for marine diesel engine, the exhaust gas in the gas intake pipeline, the SCR reactor, and the exhaust pipeline is urged by compressed air entering from the first auxiliary pipeline and the second auxiliary pipeline to be discharged from the flue gas outlet.

Alternatively, it further comprises:

a differential pressure sensor, having both ends respectively connected to the exhaust pipeline on both sides of the SCR outlet valve, and configured to detect a differential pressure between gas in the SCR reactor and gas flowing through the flue gas outlet.

Alternatively, it further comprises:

a control device electrically connected to the differential pressure sensor, the first control valve, the second control valve, and the pneumatic valve, and configured to control the pneumatic valve, the first control valve, and the second control valve to open or close.

Alternatively, the control device is configured to control the pneumatic valve, the first control valve, and the second control valve all to be opened in the venting state.

Alternatively, the control device is configured to, in a pressure-stabilizing state after the venting state, control the second control valve to be closed, control the pneumatic valve to be opened with the first control valve controlled to be closed when a monitoring value of the differential pressure sensor is above a predetermined range of differential pressure; and control the first control valve to be opened with the pneumatic valve controlled to be closed when the monitoring value of the differential pressure sensor is below a predetermined range of differential pressure.

Alternatively, the control device is configured to control the high-pressure SCR system with venting and pressure-stabilizing for marine diesel engine to vent for a predetermined venting time, and wherein the predetermined venting time is set depending on the cross-sectional area and/or length of the SCR reactor, the gas intake pipeline, and the exhaust pipeline.

Alternatively, the first auxiliary pipeline is a soot-blowing air pipeline; and/or the second auxiliary pipeline is a urea-atomization air pipeline.

Alternatively, a throttle orifice plate is further provided in the pneumatic pipeline.

Alternatively, a turbocharger is further provided in the exhaust pipeline.

According to a further aspect of the present invention, a ship comprising the above high-pressure SCR system with venting and pressure-stabilizing for marine diesel engine is also provided.

The high-pressure SCR system with venting and pressure-stabilizing for marine diesel engine according to the present invention comprises an SCR reactor, a gas intake pipeline, an exhaust pipeline, a bypass pipeline, a pneumatic pipeline, a first auxiliary pipeline, and a second auxiliary pipeline. When the exhaust gas of diesel engine is required to be denitrified, it can enter from the flue gas inlet, successively flow through the gas intake pipeline, the SCR reactor, and the exhaust pipeline and be discharged via the flue gas outlet. The exhaust gas of diesel engine can be denitrified in the SCR reactor. When the exhaust gas of diesel engine is not required to be denitrified, it can enter from the flue gas inlet, flowthrough the bypass pipeline and then be discharged via the flue gas outlet. In this case, the exhaust gas in the SCR reactor and the exhaust pipeline is urged by the compressed air entering from the first auxiliary pipeline and the second auxiliary pipeline, and thereby be discharged from the flue gas outlet. This ensures the SCR reactor and related pipelines kept clean. Compared with traditional SCR system with venting and pressure-stabilizing, the present invention abandons the conventional air pipeline adjacent to the flue gas inlet, simplifying the structure of the overall system and making the overall system more compact, which not only ensures the sufficient ventilation of the pipelines, but also reduces air consumption.

BRIEF DESCRIPTION OF THE DRAWINGS

The following drawing(s) are hereby incorporated as part of the present invention for the purpose of understanding the present invention. Embodiments of the present invention and descriptions thereof are shown in the accompanying drawings for explaining the principle of the present invention. In the drawing(s):

FIG. 1 is a schematic diagram of a high-pressure SCR system with venting and pressure-stabilizing for marine diesel engine in a preferred embodiment according to the present invention.

REFERENCE SIGNS

| | |
|---|---|
| 10: SCR reactor | 20: Gas intake pipeline |
| 21: SCR inlet valve | 30: Exhaust pipeline |
| 31: SCR outlet valve | 40: Bypass pipeline |
| 41: SCR bypass valve | 50: Pneumatic pipeline |
| 51: Pneumatic valve | 52: Throttle orifice plate |
| 60: Differential pressure sensor | 70: First auxiliary pipeline |
| 71: First control valve | 80: Second auxiliary pipeline |
| 81: Second control valve | 90: Turbocharger |

DETAILED DESCRIPTION

In the following description, various details are set forth in order to provide a more thorough understanding of the present invention. However, it is obvious to those skilled in this art that the present invention may be implemented without one or more of these details. Some technical features well-known in this art in other examples will not be described in order to avoid confusion with the present invention.

In order to thoroughly understand the present invention, a detailed structure will be presented in the following description. Obviously, the implementation of the present invention is not limited to the details familiar to those skilled in the art.

The present invention provides a high-pressure SCR system with venting and pressure-stabilizing for marine diesel engine. As shown in FIG. 1, it comprises an SCR reactor 10, a gas intake pipeline 20, an exhaust pipeline 30, a bypass pipeline 40, a pneumatic pipeline 50, a first auxiliary pipeline 70, and a second auxiliary pipeline 80.

The SCR reactor 10 can be used to denitrify the exhaust gas of a marine diesel engine. Within the SCR reactor 10, it is provided with a catalyst, such as the urea solution, which can react with $NO_X$ in the exhaust gas. The reduction reaction of $NO_X$ in the exhaust gas entering the SCR reactor 10 with the catalyst occurs and $N_2$ and $H_2O$ are generated. In actual situations whereby the composition of the catalyst varies, the temperature at which the reduction reaction occurs also varies, typically at 250° C. to 400° C.

In a preferred embodiment of the present invention, one end of the gas intake pipeline 20 is provided with a flue gas inlet, and its other end is connected to and in communication with the air inlet of the SCR reactor 10. An SCR inlet valve 21 is further provided in the gas intake pipeline 20. The exhaust gas of diesel engine enters the SCR reactor 10 through the flue gas inlet via the gas intake pipeline 20. One end of the exhaust pipeline 30 is provided with a flue gas outlet, and its other end is connected to and in communication with the air outlet of the SCR reactor 10. An SCR outlet valve 31 is further provided in the exhaust pipeline 30. The exhaust gas of diesel engine is discharged through the flue gas outlet via the exhaust pipeline 30 after flowing through the SCR reactor 10. One end of the bypass pipeline 40 is connected to and in communication with the gas intake pipeline 20, and the joint thereof is positioned between the flue gas inlet and the SCR inlet valve 21; its other end is connected to and in communication with the exhaust pipeline 30, and the joint thereof is positioned between the flue gas outlet and the SCR outlet valve 31. An SCR bypass valve 41 is further provided in the bypass pipeline 40. The pneumatic pipeline 50 is connected to both sides of the outlet valve 31, and is provided with a pneumatic valve 51 and a throttle orifice plate 52.

When the exhaust gas of diesel engine is not required to flow through the SCR reactor 10, the exhaust gas entering from the flue gas inlet can be directly discharged through the flue gas outlet via the bypass pipeline 40.

In this embodiment, when the exhaust gas of diesel engine is required to flow through the SCR reactor 10 for denitrification process, that is, when the SCR reactor 10 is required to be brought into working state, the SCR inlet valve 21 and the SCR outlet valve 31 can be opened, and the SCR bypass valve 41 can be closed. The exhaust gas of diesel engine enters the high-pressure SCR system with venting and pressure-stabilizing for marine diesel engine through the flue gas inlet, successively flows through the gas intake pipeline 20, the SCR reactor 10, and the exhaust pipeline 30, and is finally discharged through the flue gas outlet. In the case where the exhaust gas of diesel engine flows through the SCR reactor 10, the reduction reaction of $NO_X$ in the exhaust gas with the catalyst occurs.

When the exhaust gas of diesel engine is not required to flow through the SCR reactor 10 for denitrification, that is, when the SCR reactor 10 is brought into a non-working state, the SCR inlet valve 21 and the SCR outlet valve 31 can be closed, and the SCR bypass valve 41 can be opened. The exhaust gas of diesel engine enters the high-pressure SCR system with venting and pressure-stabilizing for marine diesel engine through the flue gas inlet, and is discharged through the flue gas outlet via the bypass pipeline 40. In this non-working state, the exhaust gas of diesel engine in which sulfide may be generated and lead to corrosion of devices and pipelines remains in the gas intake pipeline 20, the SCR reactor 10, and the exhaust pipeline 30. In this embodiment, the first auxiliary pipeline 70 is in communication with the SCR reactor 10, and the second auxiliary pipeline 80 is in communication with the gas intake pipeline 20. The first auxiliary pipeline 70 and the second auxiliary pipeline 80 can feed compressed air to urge the exhaust gas remaining in the gas intake pipeline 20, the SCR reactor 10, and the exhaust pipeline 30 to be discharged from the flue gas outlet.

By means of the high-pressure SCR system with venting and pressure-stabilizing for marine diesel engine according to the present invention, when the SCR reactor 10 is in the non-working state, feeding compressed air by the first auxiliary pipeline 70 and the second auxiliary pipeline 80 can urge the exhaust gas remaining in the gas intake pipeline 20, the SCR reactor 10, and the exhaust pipeline 30 to be discharged from the flue gas outlet. This ensures the SCR reactor 10 and related pipelines kept clean, simplifies the structure of the overall device, and makes the overall system more compact. This not only ensures sufficient ventilation, but also reduces air consumption.

Furthermore, it is necessary to maintain the SCR reactor 10 at a certain pressure to prevent the exhaust gas of diesel engine from entering the SCR reactor 10 and related pipelines, avoiding corrosion of the pipelines, i.e., into pressure-stabilizing state after the venting state. In present embodiment of the present invention, a differential pressure sensor 60 and a control device (not shown) are further provided.

The differential pressure sensor 60 can detect the differential pressure between the gas within the SCR reactor 10 and the gas flowing through the flue gas outlet. Particularly, both ends of the differential pressure sensor 60 are respectively connected to the exhaust pipelines 30 on both sides of the SCR outlet valve 31. The control device is electrically connected to the differential pressure sensor 60, the first control valve 71, the second control valve 81, and the pneumatic valve 51. In this embodiment, the control device can control the first control valve 71, the second control valve 81, and the pneumatic valve 51 to open or close.

Particularly, when the high-pressure SCR system with venting and pressure-stabilizing for marine diesel engine is in a venting state, the control device can control the pneumatic valve 51, the first control valve 71, and the second control valve 81 all to be opened. In this case, the first auxiliary pipeline 70 and the second auxiliary pipeline 80 can feed compressed air, which will urge the exhaust gas of diesel engine remaining in the gas intake pipeline 20, the SCR reactor 10, and the exhaust pipeline 30 to be discharged from the flue gas outlet.

Correspondingly, the control device controls the high-pressure SCR system with venting and pressure-stabilizing for marine diesel engine to vent for a predetermined venting time, which is set depending on the cross-sectional area and/or length of the SCR reactor 10, the gas intake pipeline 20, and the exhaust pipeline 30. In other words, since the specification of the SCR reactor 10 and size of the gas intake pipeline 20 and the exhaust pipeline 30 may vary, the venting time can be set different for different marine diesel engines to thereby ensure sufficient ventilation.

The high-pressure SCR system with venting and pressure-stabilizing for marine diesel engine is brought into the pressure-stabilizing state after the ending of the venting state. In the pressure-stabilizing state, the second control valve 81 is kept closed.

Further, in the pressure-stabilizing state, when the monitoring value detected by the differential pressure sensor 60 is above a predetermined range of differential pressure, that is, when the gas pressure in the SCR reactor 10 is greater than the gas pressure at the flue gas outlet, in order to protect the SCR reactor 10, the control device controls the pneumatic valve 51 in the pneumatic pipeline 50 to be opened with the first control valve 71 controlled to be closed so as to relieve the pressure in the SCR reactor 10, and finally the differential pressure between the gas in the SCR reactor 10 and the gas flowing through the flue gas outlet is maintained within the predetermined range of differential pressure. It is to be understood that after the monitoring value detected by the differential pressure sensor 60 reaches the predetermined range of differential pressure, the pneumatic valve 51 will be closed to prevent the gas pressure in the SCR reactor 10 from being too low which causes the exhaust gas of diesel engine to enter the SCR reactor 10.

When the monitoring value detected by the differential pressure sensor 60 is below the predetermined range of differential pressure, that is, when the gas pressure in the SCR reactor 10 is smaller than the gas pressure at the flue gas outlet, here the exhaust gas of diesel engine may enter the SCR reactor 10. The control device will control the first control valve 71 in the first auxiliary pipeline 70 to be opened with the pneumatic valve 51 controlled to be closed. The compressed air will enter the SCR reactor 10 via the first auxiliary pipeline 70 such that the pressure in the SCR reactor 10 is gradually increased and finally the differential pressure between the gas in the SCR reactor 10 and the gas flowing through the flue gas outlet is maintained within the predetermined range of differential pressure. It is to be understood that after the monitoring value detected by the differential pressure sensor 60 reaches the predetermined range of differential pressure, the first control valve 71 will be closed to prevent the gas pressure in the SCR reactor 10 from being too high.

Preferably, in the pressure-stabilizing state, the first auxiliary pipeline 70 may need to be supplemented with compressed air at any time. Therefore, the first auxiliary pipeline 70 is a soot-blowing air pipeline.

The second auxiliary pipeline 80 can be supplemented with compressed air in the working state of the SCR reactor 10 to atomize urea solution, and can also be supplemented with compressed air in the venting state of the high-pressure SCR system with venting and pressure-stabilizing for marine diesel engine. The second auxiliary pipeline 80 is a urea-atomization air pipeline.

Preferably, a throttle orifice plate 52 is further provided in the pneumatic pipeline 50. The throttle orifice plate 52 can ensure the flowing of gas in the pneumatic pipeline 50 and a certain gas pressure maintained in the SCR reactor 10. In addition, in the exhaust pipeline 30 is further provided a turbocharger 90, which is arranged between the flue gas outlet and the joint of the bypass pipeline 40 and the exhaust pipeline 30. The turbocharger 90 can make full use of the inertial forward force of the exhaust gas of diesel engine to increase the pressure of the gas at the air inlet (not shown) of the diesel engine.

According to a further aspect of the present invention, there is also provided a ship equipped with the aforementioned high-pressure SCR system with venting and pressure-stabilizing for marine diesel engine.

Unless otherwise defined, the technical and scientific terms used herein have the same meanings as commonly understood by those skilled in the technical field of the present invention. The terms used herein are only for describing specific implementation purposes, and are not intended to limit the present invention. The terms "disposing" and the like as used herein can have the meaning that one component is directly attached to another component, or that one component is attached to another component through an intermediate component. A feature described in one embodiment herein can be applied to another embodiment alone or in combination with other features, unless the feature is not applicable for the other embodiment or otherwise stated.

The present invention has been described through the above-mentioned embodiments, but it should be understood that the above-mentioned embodiments are only for the purpose of illustration and description, and are not intended to limit the present invention to the scope of the described embodiments. Furthermore, those skilled in the art can understand that more variations and modifications can be made in light of the teachings of the present invention. These variations and modifications all fall within the scope claimed by the present invention.

What is claimed is:

1. A high-pressure SCR system with venting and pressure-stabilizing for marine diesel engine, comprising:
    an SCR reactor configured to denitrify exhaust gas of the diesel engine;
    a gas intake pipeline connected to a gas inlet of the SCR reactor;
    an exhaust pipeline, having one end provided with a flue gas outlet and the other end connected to a gas outlet of the SCR reactor, and the exhaust pipeline being provided with an SCR outlet valve;
    a pneumatic pipeline, having both ends respectively connected to the exhaust pipeline on both sides of the SCR outlet valve, and the pneumatic pipeline being provided with a pneumatic valve;
    a first auxiliary pipeline for feeding compressed air and connected to and in communication with the SCR reactor, and the first auxiliary pipeline being provided with a first control valve;
    a second auxiliary pipeline for feeding compressed air and connected to and in communication with the gas intake pipeline, and the second auxiliary pipeline being provided with a second control valve;
    a throttle orifice plate provided in the pneumatic pipeline; and
    a control device electrically connected to a differential pressure sensor, the first control valve, the second control valve, and the pneumatic valve and configured to control the pneumatic valve, the first control valve, and the second control valve to open or close,
    wherein the differential pressure sensor has both ends respectively connected to the exhaust pipeline on both sides of the SCR outlet valve, and configured to detect a differential pressure between gas in the SCR reactor and gas flowing through the flue gas outlet, and
    wherein, in a venting state of the high-pressure SCR system with venting and pressure-stabilizing for marine diesel engine, the exhaust gas in the SCR reactor, and the exhaust pipeline is urged by compressed air entering from the first auxiliary pipeline, passes through the pneumatic pipeline, and is discharged from the flue gas outlet.

2. The high-pressure SCR system with venting and pressure-stabilizing for marine diesel engine of claim 1, wherein the control device is configured to control the pneumatic valve, the first control valve, and the second control valve all to keep open in the venting state.

3. The high-pressure SCR system with venting and pressure-stabilizing for marine diesel engine of claim 1, wherein the control device is configured to in a pressure-stabilizing state after the venting state, control the second control valve to be closed and the first control valve and the pneumatic valve to keep open, and
    control the first control valve to keep open with the pneumatic valve controlled to be closed when a monitoring value of the differential pressure sensor is below a predetermined range of differential pressure.

4. The high-pressure SCR system with venting and pressure-stabilizing for marine diesel engine of claim 1, wherein the control device is configured to control the high-pressure SCR system with venting and pressure-stabilizing for marine diesel engine to vent for a predetermined venting time, and wherein the predetermined venting time is set depending on the cross-sectional area and/or length of the SCR reactor, the gas intake pipeline, and the exhaust pipeline.

5. The high-pressure SCR system with venting and pressure-stabilizing for marine diesel engine of claim 1, wherein the first auxiliary pipeline is a soot-blowing air pipeline; and/or
    the second auxiliary pipeline is a urea-atomization air pipeline.

6. The high-pressure SCR system with venting and pressure-stabilizing for marine diesel engine of claim 1, wherein the orifice plate is positioned upstream of the pneumatic valve.

7. The high-pressure SCR system with venting and pressure-stabilizing for marine diesel engine of claim 1, further comprising: a turbocharger provided in the exhaust pipeline and positioned between the flue gas outlet and the SCR outlet valve, and the pneumatic pipeline being positioned upstream of the turbocharger.

8. The high-pressure SCR system with venting and pressure-stabilizing for marine diesel engine of claim 1, further comprising:
    a gas intake pipeline connected to a gas inlet of the SCR reactor; and
    a bypass pipeline, having one end connected to the gas intake pipeline and the other end connected to the exhaust pipeline, and the bypass pipeline being provided with an SCR bypass valve,
    wherein the joint of the bypass pipeline and the exhaust pipeline is positioned between the flue gas outlet and the SCR outlet valve.

9. The high-pressure SCR system with venting and pressure-stabilizing for marine diesel engine of claim 3, wherein the control device is configured to control the pneumatic valve to keep open with the first control valve controlled to be closed when the monitoring value of the differential pressure sensor is above a predetermined range of differential pressure.

10. A ship, wherein the ship comprises a high-pressure SCR system with venting and pressure-stabilizing for marine diesel engine comprising:
    an SCR reactor configured to denitrify exhaust gas of the diesel engine;

a gas intake pipeline connected to a gas inlet of the SCR reactor;

an exhaust pipeline, having one end provided with a flue gas outlet and the other end connected to a gas outlet of the SCR reactor, and the exhaust pipeline being provided with an SCR outlet valve;

a pneumatic pipeline, having both ends respectively connected to the exhaust pipeline on both sides of the SCR outlet valve, and the pneumatic pipeline being provided with a pneumatic valve;

a first auxiliary pipeline for feeding compressed air and connected to and in communication with the SCR reactor, and the first auxiliary pipeline being provided with a first control valve;

a second auxiliary pipeline for feeding compressed air and connected to and in communication with the gas intake pipeline, and the second auxiliary pipeline being provided with a second control valve;

a throttle orifice plate provided in the pneumatic pipeline; and a control device electrically connected to a differential pressure sensor, the first control valve, the second control valve, and the pneumatic valve and configured to control the pneumatic valve, the first control valve, and the second control valve to open or close, wherein the differential pressure sensor has both ends respectively connected to the exhaust pipeline on both sides of the SCR outlet valve, and configured to detect a differential pressure between gas in the SCR reactor and gas flowing through the flue gas outlet, and wherein, in a venting state of the high-pressure SCR system with venting and pressure-stabilizing for marine diesel engine, the exhaust gas in the SCR reactor, and the exhaust pipeline is urged by compressed air entering from the first auxiliary pipeline, passes through the pneumatic pipeline, and is discharged from the flue gas outlet.

11. The ship of claim 10, wherein the orifice plate is positioned upstream of the pneumatic valve.

12. The ship of claim 10, wherein the high-pressure SCR system with venting and pressure-stabilizing for marine diesel engine further comprises: a turbocharger provided in the exhaust pipeline and positioned between the flue gas outlet and the SCR outlet valve, and the pneumatic pipeline is positioned upstream of the turbocharger.

13. The ship of claim 10, wherein the high-pressure SCR system with venting and pressure-stabilizing for marine diesel engine further comprises:

a gas intake pipeline connected to a gas inlet of the SCR reactor; and a bypass pipeline, having one end connected to the gas intake pipeline and the other end connected to the exhaust pipeline, and the bypass pipeline being provided with an SCR bypass valve, wherein the joint of the bypass pipeline and the exhaust pipeline is positioned between the flue gas outlet and the SCR outlet valve.

14. The ship of claim 10, wherein the control device is configured to in a pressure-stabilizing state after the venting state, control the second control valve to be closed and the first control valve and the pneumatic valve to keep open, and control the first control valve to keep open with the pneumatic valve controlled to be closed when a monitoring value of the differential pressure sensor is below a predetermined range of differential pressure.

* * * * *